United States Patent [19]

Sekiguchi

[11] 3,976,335

[45] Aug. 24, 1976

[54] MODULATOR OF AN ANTISKID DEVICE FOR AIR BRAKES

[75] Inventor: Yukichi Sekiguchi, Yono, Japan

[73] Assignee: Sanwa Seiki Mfg. Co., Japan

[22] Filed: Oct. 22, 1975

[21] Appl. No.: 624,705

[30] Foreign Application Priority Data

Aug. 19, 1975 Japan .............................. 50-100352

[52] U.S. Cl. ................................ 303/21 F; 303/61
[51] Int. Cl.² .......................................... B60T 8/02
[58] Field of Search .................... 188/181 A, 181 R; 303/20, 21 F, 21 BE, 21 EB, 61

[56] References Cited
UNITED STATES PATENTS

| | | | |
|---|---|---|---|
| 3,749,125 | 7/1973 | Peruglia et al. | 303/21 F X |
| 3,854,501 | 12/1974 | Machek | 303/21 F |
| 3,913,983 | 10/1975 | Sekiguchi | 303/21 F |

Primary Examiner—Duane E. Reger
Attorney, Agent, or Firm—Jay L. Chaskin

[57] ABSTRACT

The modulator of an antiskid device for air brakes of the type wherein a throttling electric signal is produced to change the braking pressure applied by brake actuators from a rapid increase state to a slow increase state before the braking pressure reaches a pressure increase target value, a pressure reducing electric signal is produced by rapidly decrease the braking pressure when the braking pressure has reached the pressure increase target value, and a throttling electric signal is produced again to change the braking pressure from the rapid decrease state to a slow decrease state before the braking pressure reaches a pressure decrease target value comprises a first solenoid assembly, a second solenoid assembly, a first pilot valve assembly, a second pilot valve assembly and a main valve assembly.

1 Claim, 11 Drawing Figures

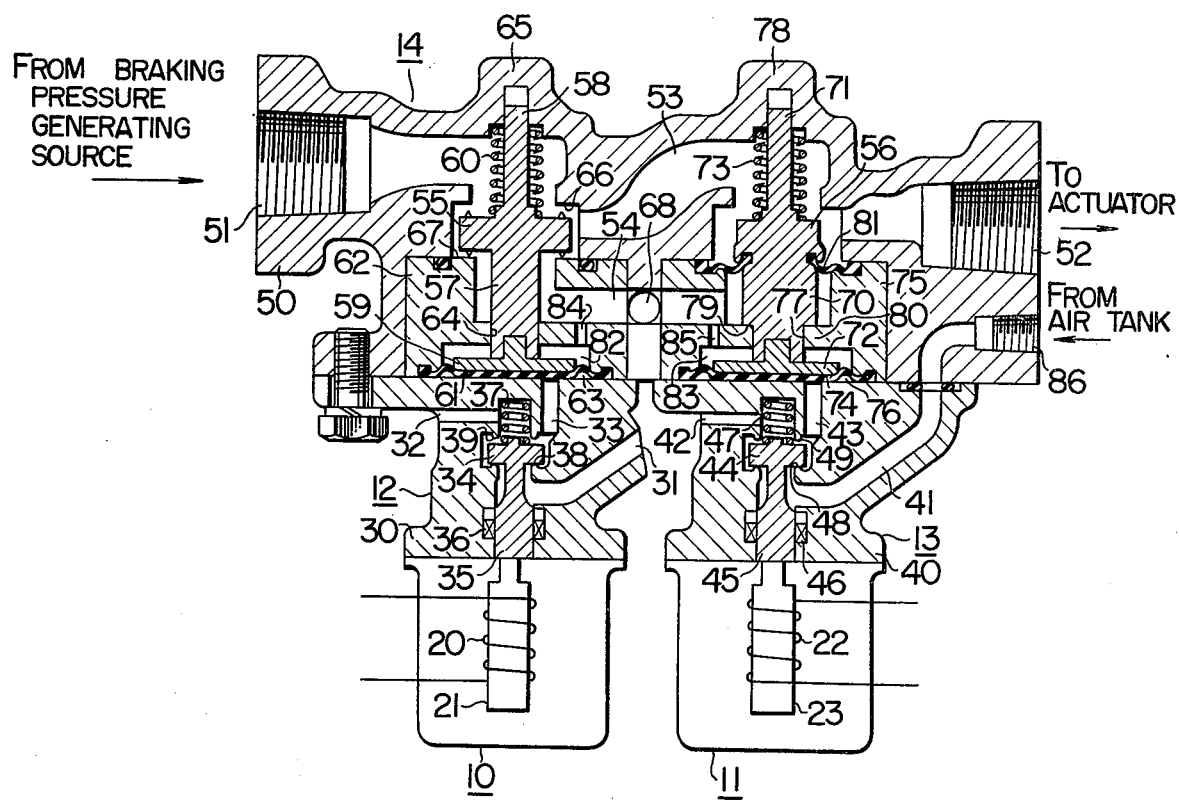
FIG. 2
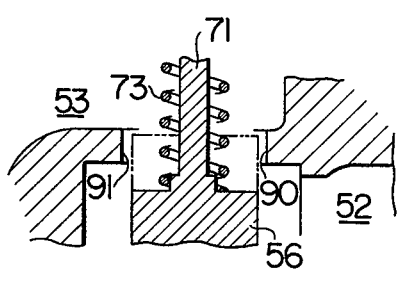
FIG. 5
FIG. 6

MODULATOR OF AN ANTISKID DEVICE FOR AIR BRAKES

BACKGROUND OF THE INVENTION

This invention relates to modulators of antiskid devices for air brakes of motor vehicles, and more particularly it is concerned with a modulator of an antiskid device for air brakes of the type wherein a throttling signal is produced by a computer to change the braking pressure from a rapid pressure increase state to a slow pressure increase state before the braking pressure reaches a pressure increase target value, a pressure reducing electric signal is produced to rapidly reduce the braking pressure when the braking pressure has reached the pressure increase target value, and a throttling signal is produced again to change the braking pressure from a rapid pressure decrease state to a slow pressure decrease state before the braking pressure reaches a pressure decrease target value.

In one type of modulator of an antiskid device for air brakes of the prior art, the modulator is actuated by a pressure reducing electric signal which is produced by the computer to discharge pressurized air from the brake actuators when the braking pressure applied by the brake actuators has reached a pressure increase target value, and pressure air is supplied to the brake actuators again as the pressure reducing electric signal is turned off when the braking pressure has reached a pressure decrease target value. In this type of modulator, there is a time lag of the initiation of a decrease or increase in the braking pressure caused by the operation of the modulator behind the turning on or off an electric signal. This has hitherto caused a rise or a fall in the braking pressure applied by the brake actuators to an unnecessarily high or low level, with the result that skidding of a moderate degree has occurred or the braking force has not been high enough, making it impossible to smoothly control the braking of the wheels.

SUMMARY OF THE INVENTION

This invention obviates the aforesaid disadvantages of the prior art. Accordingly, this invention has for its object the provision of a modulator of high performance which enables to slow down an increase or decrease in the braking pressure applied by the brake actuators to bring the braking pressure to a slow pressure increase state or a slow pressure decrease state before a pressure reducing electric signal is turned on or off and also to shorten a time lag.

According to the invention, there is provided a modulator of an antiskid device for air brakes comprising a first solenoid assembly including a plunger actuated by a pressure reducing electric signal; a second solenoid assembly including a plunger actuated by throttling electric signals; a first pilot valve assembly including a pilot valve assembly main body, a set of passages consisting of an inlet passage, a discharge passage and an operation passage formed in the main body for pressurized air from an air tank, and a pilot valve body mounted in the main body and movable between a closed position in which the inlet passage is closed and the operation passage and the discharge passage are connected and an open position in which the inlet passage and the operation passage are connected and the discharge passage is closed; a second pilot valve assembly including a pilot valve assembly including a pilot valve assembly main body, a set of passages consisting of an inlet passage, discharge passage and an operation passage formed in the main body for the pressurized air from the air tank, and a pilot valve body mounted in the main body and movable between a closed position in which the inlet passage is closed and the operation passage and the discharge passage are connected and an open position in which the inlet passage and the operation passage are connected and the discharge passage is closed; and a main valve assembly including a main valve assembly main body, a set of passages consisting of an inlet passage, a connection passage, an outlet passage and a discharge passage formed in the main body for pressurized air from a brake valve, a pressure reducing valve body mounted in the main body and movable between an open position in which the inlet passage is connected to the connection passage and a closed position in which the inlet passage is disconnected from the communication passage and the communication passage is connected to the discharge passage, a throttle valve body mounted in the main body and movable between an open position in which the communication passage is connected to the outlet passage and a throttling position in which the communication passage is connected to the outlet passage such that pressurized air can pass therethrough in a reduced quantity, a diaphragm for the pressure reducing valve body arranged to act on an end portion of a center rod of the pressure reducing valve body, and a diaphragm for the throttle valve body arranged to act on one end portion of a center rod of the throttle valve body; the first solenoid assembly being attached to one end of the first pilot valve assembly such that the plunger of the former can act on an end of a rod of the pilot valve body of the latter, the second solenoid assembly being attached to one end of the second pilot valve assembly such that the plunger of the former can act on an end of a rod of the pilot valve body of the latter, the first pilot valve assembly being attached at the other end thereof to the main valve assembly main body such that the pressurized air existing in the operation passage of the former can act on the diaphragm for the pressure reducing valve body, and the second pilot valve assembly being attached at the other end thereof to the main valve assembly main body such that the pressurized air existing in the operation passage of the former can act on the diaphragm for the throttle valve body; the plunger of the second solenoid valve valve being actuated, when the throttling electric signal is produced, to move the pilot valve body of the second pilot valve assembly from its closed position to its open position so as to connect the pressure air inlet passage thereof to the operation passage thereof, whereby pressure is applied by the pressurized air to the diaphragm for the throttle valve body to move the throttle valve body from its open position to its throttling position; and the plunger of the first solenoid assembly being actuated, when the pressure reducing electric signal is produced, to move the pilot valve body of the first pilot valve assembly from its closed position to its open position so as to connect the pressure air inlet passage thereof to the operation passage thereof, whereby pressure is applied by the pressurized air to the diaphragm for the pressure reducing valve body to move the pressure reducing valve body from its open position to its closed position and discharge the pressurized air in brake actuators through the outlet passage, the connection passage and the discharge passage of the main valve assembly.

Before giving detailed description of a preferred embodiment of the invention, a modulator of an antiskid device for air brakes of the prior art will be outlined with reference to FIG. 1. As shown in FIG. 1, the modulator of the antiskid device for air brakes of the prior art operates such that the modulator discharges pressurized air from the brake actuators as an electric signal is produced when the braking pressure applied by the brake actuators has reached a pressure increase target value $P_A$, and supplies pressurized air to the brake actuators as the electric signal is turned off when the braking signal has been reduced to a pressure decrease target value $P_B$. Here, there is a time lag T of the occurrence of a variation in the braking pressure in the brake actuators due to actuation of the modulator behind the switching of an electric signal between ON and OFF states. This causes the braking pressure in each brake actuator to become excessively high as indicated by a symbol $\Delta P_A$ or excessively low as indicated by a symbol $\Delta P_B$. The result of this is that minor skidding occurs or the braking force becomes too low, making it difficult to smoothly control the wheels. Solutions of this problem that come to mind include (1) slowing down an increase in braking pressure to change the braking pressure to a slow increase state before a pressure reducing signal is produced, and (2) reducing the time lags. This invention provides a modulator of high performance which is constructed with a view to attaining both of these ends.

BRIEF DESCRIPTION OF THE DRAWINGS

FIG. 2 is a sectional view showing the modulator of an antiskid device for air brakes comprising one embodiment of the invention;

FIG. 5 is an enlarged view of the throttle valve body and the parts associated therewith of the embodiment shown in FIG. 2; and FIG. 6 to FIG. 10 show modifications of the throttle mechanism of the throttle valve body and the parts associated therewith.

DESCRIPTION OF THE PREFERRED EMBODIMENT

Figure 1:
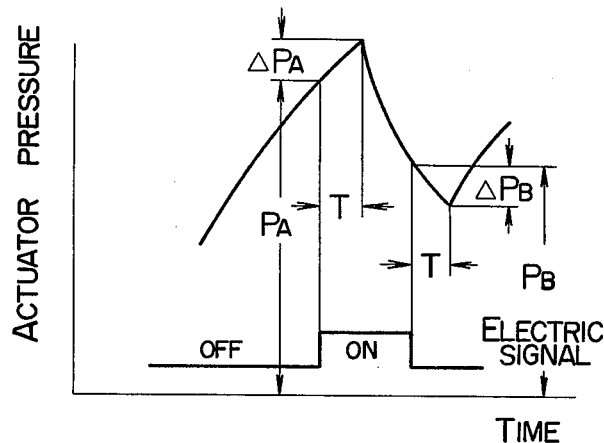
FIG. 1 is a graph showing, in chronological sequence, the relation between electric signals and changes in the braking pressure applied by the actuators caused by the electric signals when a modulator of a prior art is used with an antiskid device for air brakes.

A preferred embodiment of the present invention will now be described with reference to FIG. 2. The modulator of an antiskid device for air brakes according to the invention comprises a first solenoid assembly 10, a second solenoid assembly 11, a first pilot valve assembly 12, a second pilot valve assembly 13 and a main valve assembly 14. The first solenoid assembly 10 includes a coil 20 and a plunger 21, and the second solenoid assembly 11 also includes a coil 22 and a plunger 23. The first pilot valve assembly 12 includes a main body 30 which is disposed adjacent the first solenoid assembly 10. The main body 30 is formed therein with an inlet passage 31 connected to a pressurized air source, e.g. an air tank, (not shown), a discharge passage 32 through which pressurized air is vented to atmosphere, and an operation passage 33 for causing pressurized air to act on a diaphragm for a pressure reducing valve body subsequently to be described. Mounted in the main body 30 is a pilot valve body 34 which can move between a closed position in which the inlet passage 31 is closed and the operation passage 33 is connected to the discharge passage 32 and an open position in which the inlet passage 31 is connected to the operation passage 33 and the discharge passage 32 is closed.

Formed integrally with the pilot valve body 34 is a rod 35 which is centered so that it can move vertically in sliding movement relative to the main body 30. An air seal 36 for preventing air leakage is mounted between the rod 35 and the main body 30. 37 is a spring which normally urges by its biasing force the pilot valve body 34 to move downwardly. An inlet passage seat 38 is formed at the end of the inlet passage 31 in the first pilot valve assembly main body 30, while a discharge passage seat 39 is formed at an entrance portion of the discharge passage 32 in the main body 30. The pilot valve body 34 moves to its closed positon or open position as it is brought into abutting engagement with the inlet passage seat 38 or discharge passage seat 39.

The first solenoid assembly 10 is attached to one end of the first pilot valve assembly main body 30 such that the plunger 21 is disposed below an end portion of the rod 45 of the pilot valve body 34 and, if the coil 20 is energized, then the plunger 21 moves upwardly to push the end portion of the rod 35 so as to thereby move the pilot valve body 34 from its closed position to its open position against the biasing force of spring 37. The pilot valve 34 thus actuated is maintained in a position in which it abuts against the discharge passage seat 39. If the coil 20 is deenergized, then the pilot valve body 34 and plunger 21 are moved downwardly by the biasing force of spring 37. The pilot valve body 34 stops in a position in which it abuts against the inlet passage seat 38, while the plunger 21 is moved further downwardly by inertia and gravity to a position in which it is spaced apart from the end portion of the rod 35 of the pilot valve body 34.

The second pilot valve assembly 13 is similar in construction to the first pilot valve assembly 12 and includes a main body 40, a pressurized air inlet passage 41, a pressurized air discharge passage 42, a pressurized air operation passage 43, a pilot valve body 44, a pilot valve body operating rod 45, an air said 46, a spring 47, an inlet passage seat 48 and a discharge passage seat 49.

The main valve assembly 14 includes a main body 50 which is arranged as shown in FIG. 2 with respect to the main bodies 30 and 40 of the first pilot valve assembly 12 and second pilot valve assembly 13 respectively. The main body 50 is formed therein with an inlet passage 51 connected to a braking pressure generating source (not shown), an outlet passage 52 connected to brake chambers or other brake actuators (not shown), a communication passage 53 maintaining communication between the inlet passage 51 and an outlet passage 52, and a discharge passage 54 connected at one end thereof to the outlet passage 52 through the communication passage 53 and opens to atmosphere at the other end thereof. Mounted in the main body 50 is a pressure reducing valve body 55 which can move between an open position in which the inlet passage 51 is connected to the communication passage 53 and the communication passage 53 and the discharge passage 54 are disconnected and a closed position in which the inlet passage 51 and the communication passage 53 are disconnected and the communication passage 53 and the discharge passage 54 are connected. Also mounted in the main body 50 is a throttle valve body 56 which can move between an open position in which the communication passage 53 and the outlet passage 52 are connected and a closed position in which the communication passage 53 and the outlet passage 52 are connected such that pressurized air can pass therethrough in a reduced quantity.

The pressure reducing valve body 55 is formed integrally with center rods 57 and 58, the center rod 57 having attached to its end a push plate 59 and the center rod 58 having a spring 60 mounted around it. Disposed adjacent the push plate 69 is a diaphragm 61 for the pressure reducing valve body which is sealed and supported at its outer periphery by a diaphragm holder 62 arranged in the main valve assembly main body 50 as shown and the first pilot valve assembly main body 30. Thus, the diaphragm 61 and the main body 30 define an operation chamber 63 for which the operation passage 33 serves as an inlet. The diaphragm holder 62 supports in a center opening 64 thereof the center rod 57 of the pressure reducing valve body 55 for vertical sliding motion. The other center rod 58 of the pressure reducing valve body 55 is supported for vertical sliding motion by a portion 65 of the main body 50 as shown. The vertical movement of the pressure reducing valve body 55 is restricted as it abuts against an upper seat 66 formed in the main body 50 at the upper limit and a lower seat 67 formed in the diaphragm holder 62 at the lower limit.

A portion of the discharge passage 54 is formed in the diaphragm holder 62 and communicates with a discharge port 68 disposed substantially midway between the pressure reducing valve body 55 and the throttle valve body 56 mounted in the main body 50. Normally, the pressure reducing valve body 55 is urged to move downwardly by the biasing force of spring 60 and the pressure of air in the inlet passage 51 to its open position in which the underside of the valve body 55 is brought into abutting engagement with the lower seat 67 and the inlet passage 51 is connected to the communication passage 53. If pressurized air is introduced into the operation passage 33, then the pressurized air applies pressure to the diaphragm 61 and push plate 59 to move the valve body 55 upwardly to its closed position in which the upper surface of the valve body 55 is brought into engagement with the upper seat 66 and the inlet passage 51 and the communication passage 53 are disconnected while the communication passage 53 and the discharge passage 54 are connected.

Like the pressure reducing valve body 55, the throttle valve body 56 is formed integrally with center rods 70 and 71. There are provided a push plate 72 affixed to the center rod 70, a spring 73 mounted around the center rod 71, a diaphragm 74 for the throttle valve body disposed adjacent the push plate 72, a diaphragm holder 75, an operation chamber 76, a center opening 77 formed in the diaphragm holder 75 and a portion 78 of the main body which supports the center rod 71 for vertical sliding motion.

A portion of the diaphragm holder 75 which defines the center opening 77 cooperates with a shoulder 79 of the center rod 70 of the throttle valve body 56 and acts as a stopper 80 for restricting the vertical movement of the throttle valve body 56.

Normally, the throttle valve body 56 is urged by the biasing force of spring 73 to an open position in which its shoulder 79 abuts against the stopper 80. If pressurized air is introduced into the operation passage 43, then the pressurized air applies pressure to the diaphragm 74 and push plate 72 to move the valve body 56 to a throttling position in which the upper surface of the push plate 72 abuts against the stopper 80 and the communication passage 53 is connected to the outlet passage 52 such that the pressurized air passes therethrough in a reduced quantity. It is to be noted that, when the throttle valve body 56 is in its open position, the pressurized air in the communication passage 53 applies pressure to the valve body 56 in addition to the biasing force of spring 73, so that the throttle valve body 56 can be maintained in its open position in a stable manner.

Another diaphragm 81 is mounted near the boundary between the throttle valve body 56 and the center rod 70 to separate the pressurized air passages 52 and 53 side from the center rod 70 side and prevent the flow of pressurized air therebetween. The diaphragm 81 is sealed and supported at its outer periphery by the main body 50 and the diaphragm holder 75.

A diaphragm chamber 82 formed below the pressure reducing valve body 55 and a diaphragm chamber 83 formed below the throttle valve body 56 are formed therein with openings 84 and 85 respectively for releasing through the discharge port 68 the air in the chambers when the diaphragms 61 and 74 are pressed to move upwardly. The main body 50 is formed therein with a pressurized air supply passage 86 connected to supply pressurized air to the inlet passages 31 and 41 of the first and second pilot valve assemblies 12 and 13 respectively.

Figure 4:
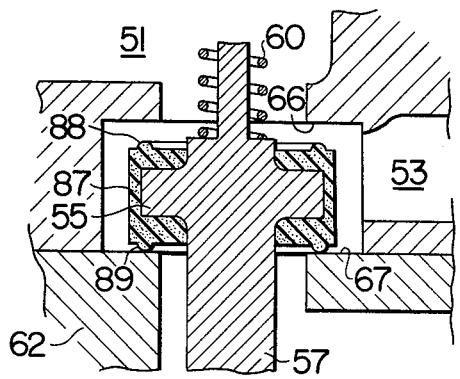
FIG. 4 is an enlarged view of the pressure reducing valve body and the parts associated therewith of the embodiment shown in FIG. 2.

FIG. 4 is an enlarged view showing the pressure reducing valve body 55 and the upper seat 66 formed in the main valve assembly main body 50 and the lower seat 67 formed in the diaphragm holder 62 to cooperate with the pressure reducing valve body 55. The upper and lower seats 66 and 67 each provide a smooth planar surface. The pressure reducing valve body 55 are covered at its surface with rubber or other resilient material 87 and formed, at surfaces which are juxtaposed against the upper and lower seats 66 and 67, with annular projections 88 and 89 respectively which are rounded to have a radius of about 0.5 mm as shown. By constructing the pressure reducing valve body 55 as aforementioned, it is possible to provide higher airtightness between the valve and the seats because the resilient projections 88 and 89 provide a high surface pressure, and the durability of the valve body can be increased because deformation of the resilient material 87 is lessened. Moreover, this arrangement enables to produce the valve on a mass production basis and hence to reduce cost.

FIG. 5 is an enlarged view of the throttle valve body 56 and a portion of the main valve assembly body 50 which cooperates with the valve body 56. As shown, the main body 50 is formed therein with an orifice 90 of a diameter which is greater than that of the throttle valve body 56. When the throttle valve body 56 moves to its throttling position shown in dash-and-dot lines, an annular gap 91 is formed in the orifice 90 between the valve body 56 and the main body 50. Accordingly, when the throttle valve body 56 is in its throttling position, pressurized air passes through the annular gap 91 so that the pressurized air moves between the communication passage 53 and the outlet passage 52 in a reduced quantity.

FIG. 6 to FIG. 10 show modifications of the throttle mechanism for the throttle valve body 56. In the modification shown in FIG. 6, the throttle valve body 56 is formed therein with a tapering portion 91A and has a diameter which is greater than that of the orifice 90. When the throttle valve body 56 moves to its throttling position shown in dash-and-dot lines, a throttling passage is formed between the tapering portion 91A and an edge 92 of the orifice 90 at its outlet side.

Figure 7A:
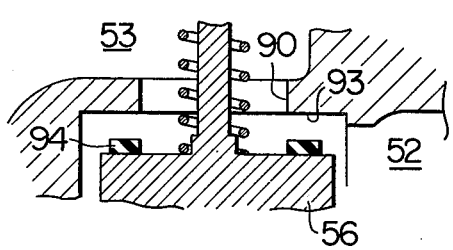
Figure 7B:
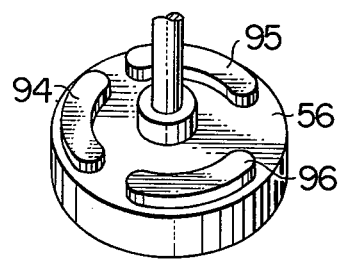

The modification shown in FIG. 7A and FIG. 7B includes a planar and smooth seat 93 formed on the orifice outlet side of the main body 50 of the main valve assembly 14, and three arcuate projections 94, 95 and 96 made of a resilient material and arranged equidistantly from one another on an upper surface of the throttle valve body 56 which is juxtaposed against the seat 93. When the throttle valve body 56 is moved to its throttling position, the arcuate projections 94, 95 and 96 come into abutting engagement with the seat 93 at their upper surfaces, so that pressurized air moves in a reduced quantity through gaps formed between the annular projections.

Figure 8:
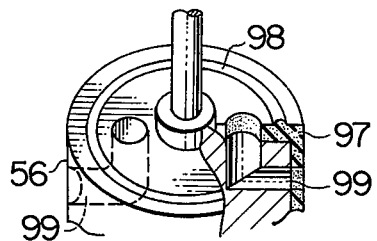
Figure 9:
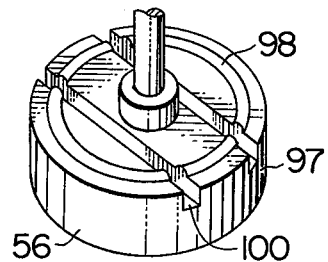

FIG. 8 and FIG. 9 show other modifications. In the modifications shown in these figures, the throttle valve body 56 is covered with a resilient material 97 as shown like the pressure reducing valve body 55, and is formed with an annular projection 98 disposed on its upper surface. The throttle valve body 56 shown in FIG. 8 is formed therein with a pair of L-shaped passages 99 disposed in diametrically opposed positions and adapted to open at the upper surface and the outer periphery of the throttle valve body 56. The throttle valve body 56 shown in FIG. 9 is formed on its upper surface with two parallel slits 100 in place of the L-shaped passages 99. In the two modifications, when the throttle valve body 56 moves to its throttling position, the air passage is blocked by the annular projection 98, so that pressurized air moves through the L-shaped passages 99 or slits 100 in a reduced quantity.

Figure 10:
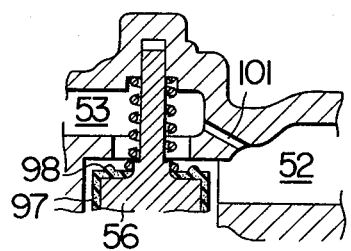

FIG. 10 shows a modification in which the throttle valve body 56 is covered with the resilient material 97 and formed with the annular projection 98 like the modifications shown in FIG. 8 and FIG. 9, while a throttle passage 101 is formed in the main body 50 of the main valve assembly 14 to maintain communication between the communication passage 53 and the outlet passage 52, without forming the L-shaped passages or the slits in the throttle valve.

The operation of the modulator constructed as aforementioned and changes in braking pressure will now be described in chronological sequence with reference to FIG. 3. At a time to, the braking pressure applied by the brake actuators is rapidly increased. At this time, the pressure reducing valve body 55 and throttle valve body 56 of the modulator are in their open positions. As the braking pressure draws near a pressure increase target value $P_A$, throttling electric signal is produced by the computer at a time $t_1$ which is before the braking pressure reaches the target value. This electric signal is supplied to the coil 22 of the second solenoid assembly 11 of the modulator and actuates the plunger 23 so as to move the throttle valve body 56 to its throttling position. Thus, the braking pressure is throttled and its increase is slowed down at a time $t_2$ after a time lag T of $t_2$ behind $t_1$. When the braking pressure reaches the pressure increase target value $P_A$, the throttling electric signal is turned off at a time $t_3$ and a pressure reducing electric signal is simultaneously produced by the computer and supplied to the coil 20 of the first solenoid assembly 10 to actuate the plunger 21. This moves the pressure reducing valve body 55 to its closed position, while the throttle valve body 56 is restored to its open position. Thus, the inlet passage 51 and the communication passage 53 are closed, and the communication passage 53 and the discharge passage 54 are connected and the communication passage 53 is connected to the outlet passage 52 again in the main valve assembly 14. Because of this, the braking pressure is rapidly reduced at a time $t_4$ after a time lag T of $t_4$ behind $t_3$.

As the braking pressure draws near a pressure decrease target value $P_B$, a throttling electric signal is produced by the computer and supplied to the coil 22 again at a time $t_5$. This actuates the plunger 23 to move the throttle valve body 56 to its throttling position again. This changes the braking pressure from a rapid decrease state to a slow decrease state at a time $t_6$ after a time lag T of $t_6$ behind $t_5$. When the braking pressure reaches the pressure decrease target value PB, the throttling and pressure reducing electric signals are both turned off at a time $t_7$. This restores the pressure reducing valve body 55 and the throttle valve body 56 to their initial open positions. The braking pressure rapidly increases at a time $t_8$ after a time lag T of $t_8$ behind $t_7$ till it reaches the pressure increase target value $P_A$ in the next following cycle. By repeating the cycle of operations starting at the time $t_o$ and ending at the time $t_8$, it is possible to smoothly effect control of the braking pressure.

The operation of the modulator itself will be described more in detail. First, the operation of the first pilot valve assembly 12 will be described. When an electric current is passed to the coil 20, the plunger 21 is moved upwardly to move the rod 35 and pilot valve body 34 upwardly. This releases the pilot valve body 34 from engagement with the inlet passage seat 38 to connect the inlet passage 31 to the operation passage 33, and brings the pilot valve body 34 into abutting engagement with the discharge passage seat 39 to disconnect the operation passage 33 and the discharge passage 32. The result of this is that the pressurized air supplied from the air tank passes through the supply passage 86, inlet passage 31 and operation passage 33 into the operation chamber 63 of the main valve assembly 14 in which the pressurized air acts on the diaphragm 61.

Figure 3:
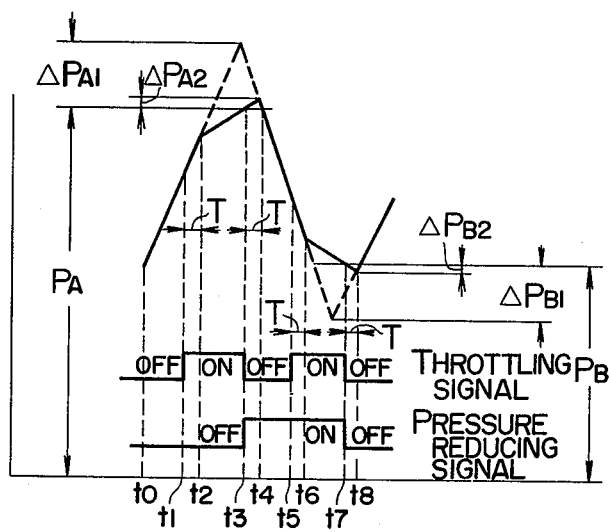
FIG. 3 is a graph showing, in chronological sequence, the relation between electric signals and changes in the braking pressure applied by the actuators caused by the electric signals when the modulator of the present invention is used.

When the electric current passed to the coil 20 is turned off, the plunger 21 is de-energized and allows the pilot valve body 34 to be moved downwardly by the biasing force of spring 37, so that the valve body 34 returns to the position shown in FIG. 3. Thus, the inlet passage 31 and the operation passage 33 are disconnected again and the operation passage 33 and the discharge passage 34 are connected, so that the pressurized air in the operation chamber 63 is vented to atmosphere through the operation passage 33 and the discharge passage 34. By constructing the inlet passage seal surface 38 and the discharge passage seal surface 39 such that their effective diameters are substantially equal to the diameter of the rod 35, it is possible to apply pressure to the rod in a balanced condition. Thus the rod 35 can be moved by a very low force. This makes it possible to reduce the size of the first solenoid assembly 10 and to reduce the force of inertia generated by vibration to a degree such that it is negligible. It will be understood that, as aforesaid, the first pilot valve assembly 12 operates such that it feeds pressurized air to the operation chamber 63 of the main valve assembly 14 when an electric signal is passed to the first solenoid assembly 10, and releases the pressurized air in the operation chamber 63 to atmosphere when the electric signal to the solenoid assembly 10 is turned off. Description of the operation of the pilot valve assembly 13, which is similar to that of assembly 12, will be omitted.

The operation of the main valve assembly 14 will now be described. The pressurized air fed from a relay valve or other braking pressure generating source passes through the inlet passage 51, communication passage 53 and outlet passage 54 to brake chambers or other brake actuators. If no electric signal is applied to the solenoid assemblies 10 and 11, the pressure reducing valve body 55 and throttle valve body 56 are disposed in their open positions as shown in FIG. 3, so that substantially no resistance is offered to the passage of air between the inlet passage 51 and outlet passage 52 and pressurized air can pass freely therethrough. So long as pressurized air exists in the inlet passage 51 and communication passage 53, the force of the pressurized air acts on self-shifts and maintains the pressure reducing valve body 55 and throttle valve body 56 in their open positions in a stable manner.

Upon an electric signal being supplied to the first solenoid assembly 10, the pilot valve body 34 is actuated as aforesaid to allow pressurized air to be introduced into the operation chamber 63. Thus an upwardly directed pressing force is exerted on the diaphragm 61. The pressing force existing in the operation chamber 63 overcomes the biasing force of spring 60 and the force of the self-shift exerted by the pressurized air in the inlet passage 51, with the result that the pressure reducing valve body 55 is moved to its closed position through the push plate 59 and center rod 57. Thus, the pressure reducing valve body 55 is released from engagement with the lower seat 67 and brought into engagement with the upper seat 66. This disconnects the inlet passage 51 and communication passage 53 and connects the communication passage 53 and discharge passage 54. Thus, the pressurized air in the brake actuators is released to atmosphere through the discharge passage 54 and discharge port 68, thereby reducing the braking force existing in the brake actuators. Thus, the electric signal supplied to the first solenoid assembly 10 is referred to as a pressure reducing electric signal.

Upon an electric signal being supplied to the second solenoid assembly 11, pressurized air is supplied to the operation chamber 76 in the same manner as described with reference to the first pilot valve assembly. This causes the throttle valve body 56 to move upwardly to its throttling position and stop as the upper surface of the push plate 72 is brought into engagement with the stopper 80.

When disposed in the throttling position, the throttle valve body 56 is inserted in the orifice 90, with the small gap 91 being formed between the valve body 56 and orifice 90 as shown in FIG. 5. Thus the communication passage and outlet passage 52 is connected through a throttle interposed therebetween, so that the flow of pressurized air to and from the brake actuators is reduced in quantity. This means that an increase or decrease in the braking pressure applied by the brake actuators is slowed down. Thus, the electric signal supplied to the second solenoid assembly 11 is referred to as a throttling electric signal. When the pressure reducing signal or throttling signal is turned off, the pressure in the operation chamber 63 or 76 is reduced to zero. This permits the pressure reducing valve body 55 or throttling valve body 56 to be restored to its original position or open position by the biasing forces of spring 60 or 73 and by the force of the respective self-shift.

From the foregoing description, it will be appreciated that the modulator according to the invention of an antiskid device for air brakes operates such that a throttling electric signal is produced to move the throttle valve body to its throttling position to create a slow pressure increase state before the braking pressure reaches a pressure increase target value when the braking pressure in the brake actuators is switched from a pressure increase state to a pressure decrease state, and a throttling signal is also produced to move the throttle valve body to its throttling position to create a slow pressure decrease state before the braking pressure reaches a pressure decrease target value when the braking pressure is switched from the pressure decrease state to the pressure increase state. By this arrangement, it is possible to reduce an excessive rise or fall in the braking pressure which occurs due to the time lag of the initiation of a decrease or an increase in the braking pressure behind the turning on or off a pressure reducing signal. Generally, the pressure immediately before and after the pressure is reduced or increased is an optimum braking pressure. As described above, the pressure is in a slow increase state or slow decrease state during that time interval when the modulator according to the invention is used. This means that the time interval during which an optimum braking pressure is applied is prolonged, so that it is possible to effect control of the application of the brake with a high degree of efficiency. Also, the existance of the slow pressure increase state and slow pressure decrease state is conductive to reduced consumption of pressurized air.

The pressurized air operation means in the form of pilot valve assemblies are used for operating the main valve assembly. This enables to use compact solenoid assemblies which respond quickly, so that the time lag can be reduced, the consumption of electricity is reduced and resistance to vibration is increased.

According to the invention, the main valve assembly is actuated by means of diaphragms which are actuated by pressurized air. This permits each valve body to operate positively, so that the valve assembly is highly reliable is performance. The use of the self-shift for maintaining each valve body ensures that the operation of the valve can be performed with a high degree of safety.

I claim:
1. In a modulator of an antiskid device for air brakes of the type wherein a throttling electric signal is produced before the braking pressure applied by brake actuators reaches a pressure increase target value to change the braking pressure from a rapid pressure increase state to a slow pressure increase state, a pressure reducing electric signal is produced when the braking pressure has reached the pressure increase target value to rapidly decrease the breaking pressure, and producing a throttling electric signal again before the braking pressure reaches a pressure decrease target value so as to change the braking pressure from a rapid pressure decrease state to a slow pressure decrease state, the improvements wherein the modulator comprises:

- a first solenoid assembly including a plunger adapted to be actuated by said pressure reducing electric signal;
- a second solenoid assembly including a plunger adapted to be actuated by said throttling electric signals;
- a first pilot valve assembly including a pilot valve assembly main body, a set of passages consisting of an inlet passage, a discharge passage and an operation passage formed in said main body for pressurized air from an air tank, and a pilot valve body mounted in said main body and movable between a closed position in which the inlet passage is closed and the operation passage and the discharge passage are connected and an open position in which the inlet passage and the operation passage are connected and the discharge passage is closed;
- a second pilot valve assembly including a pilot valve assembly main body, a set of passages consisting of an inlet passage, a discharge passage and an operation passage formed in said main body for the pressurized air from the air tank, and a pilot valve body mounted in said main body and movable between a closed position in which the inlet passage is closed and the operation passage and the discharge passage are connected and an open position in which the inlet passage and the operation passage are connected and the discharge passage is closed; and
- a main valve assembly including a main valve assembly main body, a set of passages consisting of an inlet passage, a connection passage, an outlet passage and a discharge passage formed in said main body for pressurized air from a brake valve, a pressure reducing valve body mounted in said main body and movable between an open position in which the inlet passage is connected to the communication passage and a closed position in which the inlet passage is disconnected from the communication passage and the communication passage is connected to the discharge passage, a throttling valve body mounted in said main body and movable between an open position in which the communication passage is connected to the outlet passage and a throttling position in which the communication passage is connected to the outlet passage such that pressurized air can pass therethrough in a reduced quantity, a diaphragm for the pressure reducing valve body arranged to act on an end portion of a center rod of the pressure reducing valve body, and a diaphragm for the throttle valve body arranged to act on one end portion of a center rod of the throttle valve body; the first solenoid assembly being attached to one end of the first pilot valve assembly such that the plunger of the former can act on an end of a rod of the pilot valve body of the latter, the second solenoid assembly being attached to one end of the second pilot assembly such that the plunger of the former can act on an end of a rod of the pilot valve body of the latter, the first pilot valve assembly being attached at the other end thereof to the main valve assembly main body such that the pressurized air existing in the operation passage of the former can act on the diaphragm for the pressure reducing valve body, and the second pilot valve assembly being attached at the other end thereof to the main valve assembly main body such that the pressurized air existing in the operation chamber of the former can act on the diaphragm for the throttle valve body; the plunger of the second solenoid assembly being actuated, when the throttling electric signal is produced, to move the pilot valve body of the second pilot valve assembly from its closed position to its open position so as to connect the pressure air inlet passage thereof to the operation passage thereof, whereby pressure is applied by the pressurized air to the diaphragm for the throttle valve body to move the throttle valve body from its open position to its throttling position; and the plunger of the first solenoid assembly being actuated, when the pressure reducing signal is produced, to move the pilot valve body of the first pilot valve assembly from its closed position to its open position so as to connect the pressure air inlet passage thereof to the operation passage thereof, whereby pressure is applied by the pressurized air to the diaphragm of the pressure reducing valve body to move the pressure reducing valve body from its open position to its closed position and discharge the pressurized air in brake actuators through the outlet passage, the connection passage and the discharge passage of the main valve assembly.

* * * * *